United States Patent
Deppert et al.

[11] Patent Number: 6,003,227
[45] Date of Patent: Dec. 21, 1999

[54] PROCESS FOR MANUFACTURING A PISTON RING

[75] Inventors: Norbert Deppert, Gochsheim; Gerald Fenn, Pfersdorf; Hasan Asadi, Schweinfurt, all of Germany

[73] Assignee: Mannesmann Sachs AG, Schweinfurt, Germany

[21] Appl. No.: 08/985,726

[22] Filed: Dec. 5, 1997

[30] Foreign Application Priority Data

Dec. 10, 1996 [DE] Germany ............... 196 51 161

[51] Int. Cl.[6] .................................. B23P 15/00
[52] U.S. Cl. ..................... 29/888.072; 29/888.07; 264/264
[58] Field of Search ................ 29/888.074, 888.072, 29/888.07; 277/310; 264/241, 264

[56] References Cited

U.S. PATENT DOCUMENTS

| | | | |
|---|---|---|---|
| 1,474,024 | 11/1923 | Cowles | 29/888.072 |
| 4,214,507 | 7/1980 | Hock et al. | |
| 4,559,685 | 12/1985 | Hara et al. | 29/888.072 |
| 4,655,983 | 4/1987 | Philby | 29/888.072 |
| 5,032,335 | 7/1991 | Wilson | 264/113 |
| 5,067,393 | 11/1991 | Kawasaki et al. | 92/186 |
| 5,124,397 | 6/1992 | Kanazawa et al. | 524/495 |
| 5,218,763 | 6/1993 | Marker et al. | 29/888.092 |
| 5,282,412 | 2/1994 | Ebbing | 92/240 |
| 5,424,022 | 6/1995 | Koga | 264/532 |

FOREIGN PATENT DOCUMENTS

| | | | |
|---|---|---|---|
| 0 093 859 | 3/1983 | European Pat. Off. | G01D 5/20 |
| 0 486 402 | 5/1992 | European Pat. Off. | |
| 2 635 365 | 2/1990 | France | |
| 40 32 609 | 1/1992 | Germany | F16F 9/36 |
| 44 10 996 | 6/1995 | Germany | F16F 9/32 |
| 44 21 968 | 1/1996 | Germany | F16F 9/36 |
| 6-122151 | 12/1995 | Japan | F16F 9/32 |

*Primary Examiner*—Irene Cuda
*Attorney, Agent, or Firm*—Cohen, Pontani, Lieberman & Pavane

[57] ABSTRACT

A process for manufacturing a molded piston ring for a piston in a piston-cylinder unit from a material which can be molded in a master mold. The surfaces of the piston in contact with the piston ring are provided with a separating agent which substantially prevents adhesive contact between the piston and piston ring. The piston is placed in the master mold including a shaping piece which at least partially contacts the circumferential surface of the piston. As a result of piston ring material being pressed in at the contact point or contact points of the shaping piece an expansion zone is formed at the piston which is free from the piston ring material.

3 Claims, 1 Drawing Sheet

PROCESS FOR MANUFACTURING A PISTON RING

BACKGROUND OF THE INVENTION

1. Field of the Invention

The present invention is directed to a process for manufacturing a molded piston ring for a piston of a piston-cylinder unit.

2. Description of the Related Art

German patent publication 44 10 996 C1 discloses a flat-topped piston for a vibration damper the exterior surface of which is covered by a piston ring. According to the description, the piston ring can be made of plastic and injected on or, alternatively, rolled onto the piston. This is achieved using a two-shell or two-sheet strip material comprising a reinforcement and a sliding strip.

A plastic piston ring is disadvantageously burdened by even the slightest possible axial play. To overcome this problem, the piston ring may be pretensioned, as for example taught by German Patent publication 40 32 609 C1.

Another problem associated with manufacturing the piston ring using a plastic material is that since a plastic piston ring is subjected to extensive thermal expansions a space or by-pass results between the inner wall of the cylinder and the piston ring at relatively low temperatures and increased friction in the vibration damper at elevated temperatures.

Plastic piston rings can also be produced as individual parts by injection molding. These individual parts have a joint and are pinned to the piston and thus require considerable production efforts and exhibit significant axial play. In a piston ring with a cross-section shown in FIG. 3 of German Patent publication 44 10 996 C1, undercuts occur as a result of the covered surfaces holding the piston ring at the piston which can be eliminated or controlled only by special molding techniques, especially the releasing of the piston ring from the injection mold, that are significantly more complex and accordingly more expensive.

SUMMARY OF THE INVENTION

It is the object of the present invention to provide a process for manufacturing a molded piston ring using a relatively simple master mold to produce a piston ring that exhibits relatively small axial play.

This object is met, according to the invention, in that the surfaces of the piston contacting the piston ring are provided with a separating agent or parting agent which substantially prevents adhesive contact between the piston and the piston ring. The piston is placed in a master mold with a shaping piece which at least partially contacts the circumferential surface of the piston, so that after the piston ring material is injected, at the contact point or contact points of the shaping piece a zone results at the piston which is free from the piston ring material. In spite of the master mold technique used to the manufacture of the piston ring, radial elasticity in the piston ring is achieved because of the joint formed by the shaping piece that compensates for the thermal changes in combination with a positioning of the piston ring so as to be substantially free of axial play.

Conventional pinned-on piston rings require a significant number of finishing steps. Unlike this conventional method for manufacturing piston rings, the process according to the invention does not require finishing steps at the circumferential surface of the piston before being placed in the master mold. In addition, the piston is constructed as a stamped part whose burrs and edge deformities caused by the manufacturing process in the region of the circumferential edge may be retained. Substantially all finishing steps can be dispensed with since the applied piston ring material covers all burrs and edge deformations.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
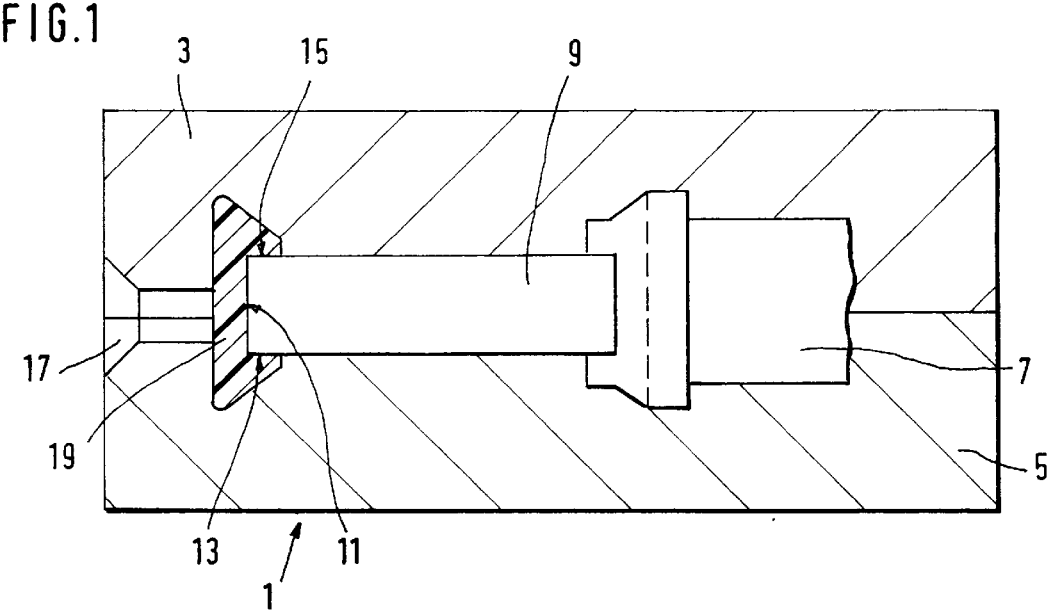
FIG. 1 shows a master mold with a piston inserted therein in accordance with the present invention.
Figure 3:
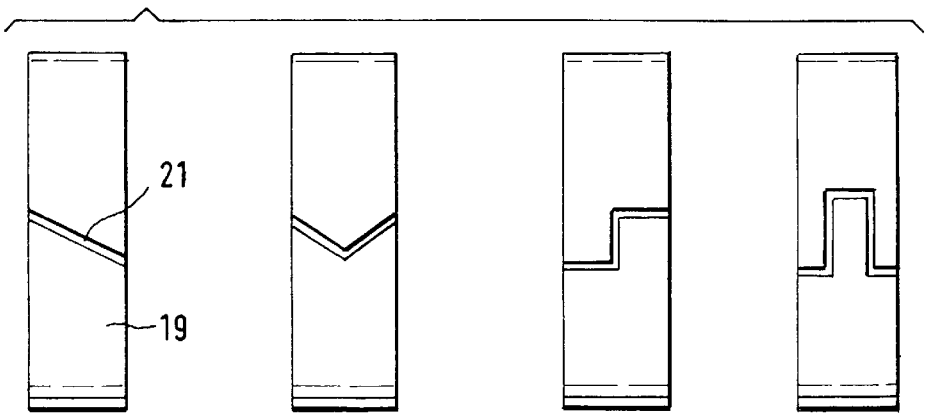
FIG. 3 shows different joint geometries of the piston ring.

FIG. 1 is a simplified view of a master mold 1 used during the injection molding process according to the present invention. The master mold 1 comprises an upper part 3 and lower part 5, each of which is free from undercuts. A shaping piece 7 is arranged in the master mold 1. At the beginning of the process a piston 9, preferably a flat-topped piston for a piston-cylinder unit, is placed in the master mold. The flat piston is provided with a separating agent at its circumferential surface 11 and at holding surfaces 13, 15 which substantially prevents adhesive contact between a plastic material injected through an injection port 17 to form a piston ring 19 and the piston 9. The injected plastic material does not completely enclose the piston because the shaping piece 7 is in direct contact with the piston. Thus, the shaping piece forms a zone in the piston ring that is free from plastic material. As shown in FIG. 3, this zone constitutes an expansion joint 21 for the piston ring 19 produced in the master mold.

Figure 2:
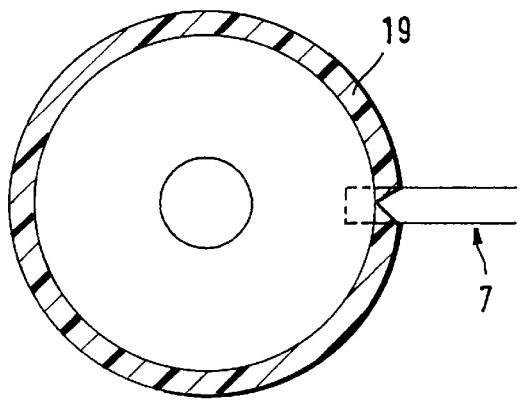
FIG. 2 shows a top view of the piston and shaping piece.

Referring to FIG. 1, the shaping piece 7 also covers a part of the upper and lower side of the piston in the region of the holding surfaces 13, 15 of the piston. Consequently, the expansion joint 21 passes completely through the piston cross section. FIG. 2 is a top view of the piston in the master mold. The dashed lines show that the shaping piece covers an edge zone having the width of the expansion joint of the piston ring on the upper side and lower side of the piston, wherein only one piston side is shown.

Various joint shapes of the piston ring are shown in FIG. 3. Ultimately, the joint is determined by the shape of the shaping piece and an infinite number of variations are possible.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A process for manufacturing a molded piston ring for a piston in a piston-cylinder unit comprising the steps of:

(a) providing a separating agent on surfaces of the piston contacting the piston ring to substantially prevent adhesive contact between the piston and piston ring;

(b) placing the piston into a master mold having a shaping piece arranged therein which contacts a portion of a circumferential surface of the piston; and (c) injecting a piston ring material into the master mold until the piston ring material is pressed into a contact point of the shaping piece to create a zone at the piston which is free from the piston ring material.

2. The process in accordance with claim 1, wherein no finishing steps are required at the circumferential surface of the piston before said step (b).

3. The process in accordance with claim 1, wherein the piston includes one of burrs and edge deformities resulting from a stamping manufacturing process which are retained.

* * * * *